US 7,996,421 B2

(12) United States Patent
Brooks et al.

(10) Patent No.: US 7,996,421 B2
(45) Date of Patent: Aug. 9, 2011

(54) METHOD, COMPUTER PROGRAM PRODUCT, AND SYSTEM FOR COORDINATING ACCESS TO LOCALLY AND REMOTELY EXPORTED FILE SYSTEMS

(75) Inventors: John L. Brooks, Ulster Park, NY (US); Renata Rand McFadden, Clinton Corners, NY (US); William J. Schoen, Poughkeepsie, NY (US); James M. Showalter, Endwell, NY (US); David A. Wise, New Paltz, NY (US)

(73) Assignee: International Business Machines Corporation, Armonk, NY (US)

( * ) Notice: Subject to any disclaimer, the term of this patent is extended or adjusted under 35 U.S.C. 154(b) by 257 days.

(21) Appl. No.: 11/619,409

(22) Filed: Jan. 3, 2007

(65) Prior Publication Data

US 2008/0162582 A1 Jul. 3, 2008

(51) Int. Cl.
*G06F 7/00* (2006.01)
*G06F 17/30* (2006.01)
(52) U.S. Cl. .................... 707/770; 707/769; 707/781
(58) Field of Classification Search .............. 709/217; 707/770, 769, 781
See application file for complete search history.

(56) References Cited

U.S. PATENT DOCUMENTS

| 5,175,851 | A | * | 12/1992 | Johnson et al. ............ 707/8 |
| 5,416,921 | A | | 5/1995 | Frey et al. |
| 5,454,108 | A | | 9/1995 | Devarakonda et al. |
| 5,537,574 | A | | 7/1996 | Elko et al. |
| 5,758,334 | A | | 5/1998 | Knight, III et al. |
| 6,031,978 | A | * | 2/2000 | Cotner et al. ............ 709/248 |
| 6,078,929 | A | | 6/2000 | Rao |
| 6,192,408 | B1 | | 2/2001 | Vahalia et al. |
| 6,275,953 | B1 | | 8/2001 | Vahalia et al. |
| 6,385,701 | B1 | | 5/2002 | Krein et al. |
| 6,489,954 | B1 | | 12/2002 | Powlette |
| 6,622,177 | B1 | | 9/2003 | Eilert et al. |
| 6,728,716 | B1 | | 4/2004 | Bhattacharya et al. |
| 6,828,716 | B2 | | 4/2004 | Bhattacharya et al. |
| 7,058,696 | B1 | * | 6/2006 | Phillips et al. ............ 709/217 |
| 7,519,596 | B2 | * | 4/2009 | Iyer et al. ............ 707/9 |
| 2002/0026560 | A1 | | 2/2002 | Jordan et al. |
| 2002/0104080 | A1 | | 8/2002 | Woodard et al. |
| 2003/0115218 | A1 | | 6/2003 | Bobbit et al. |
| 2003/0187883 | A1 | | 10/2003 | Zelenka et al. |

(Continued)

OTHER PUBLICATIONS

Peter J. Braam & Philip A. Nelson, Removing Bottlenecks in Distributed Filesystems Coda & Intermezzo as examples (1999) http://www-2.cs.cmu.edu/afs/cs/project/coda-www/ResearchWebPages/docdir/linuxexpo99.pdf.

(Continued)

*Primary Examiner* — Paul Kim
(74) *Attorney, Agent, or Firm* — Cantor Colburn LLP; William A. Kinnaman, Jr.

(57) ABSTRACT

Application access to locally and remotely exported file systems is coordinated to allow caching data for exported file systems accessed by remote clients. In response to a request or file system access, it is determined whether the request relates to a locally exported file system or a remotely exported file system. If the request relates to a locally exported file system, a local access routine is invoked to obtain access permissions to the locally exported file system. If the request relates to remotely exported file system, a remote access routine is invoked to communicate with a local access routine in a file server responsible for coordinating access to the remotely exported file system to obtain access permissions to the remotely exported file system.

20 Claims, 3 Drawing Sheets

U.S. PATENT DOCUMENTS

| | | |
|---|---|---|
| 2003/0200436 A1 | 10/2003 | Eun et al. |
| 2004/0054777 A1 | 3/2004 | Ackaouy et al. |
| 2004/0064434 A1 | 4/2004 | Sampson |
| 2004/0255048 A1 | 12/2004 | Lev Ran et al. |
| 2005/0091448 A1 | 4/2005 | Nakatani et al. |
| 2006/0123062 A1 | 6/2006 | Bobbitt et al. |
| 2007/0022087 A1 | 1/2007 | Bahar et al. |
| 2007/0162564 A1 | 7/2007 | Williams et al. |

OTHER PUBLICATIONS

Dahlin et al. Cooperative Caching: Using Remote Client Memory to Improve File System Performance, Proc. of 1st Symp. on Operating Systems Design and Implementation, pp. 1-14, 1994, http://www.usenix.org/publications/library.proceedings/osdi/full_papers/dahlin.a.

Rogers et al., "OS/390 Version 2 Release 10 Implementation", IBM RedBooks SG24-5976-00, Mar. 2001, pp. 1-226, IBM: International Technical Support Organization.

Cooperative Caching: Using Remote Client Memory to Improve File System Performance, [online]; [retrieved on Feb. 2, 2011]; retrieved from the Internet http://www.usenix.org/publications/library/proceedings/osdi/ull_papers/dahlin.a.

Removing Bottlenecks in Distributed Filesystems: Coda & InterMezzo as examples, [online]; [retrieved on Feb. 2, 2011]; retrieved from the Internet http://www-2.cs.cmu.edu/afs/cs/project/coda-www/ResearchWebPages/docdir/linuxexpo99.pdf.

\* cited by examiner

METHOD, COMPUTER PROGRAM PRODUCT, AND SYSTEM FOR COORDINATING ACCESS TO LOCALLY AND REMOTELY EXPORTED FILE SYSTEMS

BACKGROUND

The present disclosure relates generally to file access, and, in particular, to coordinating file system access.

In a general purpose computer system environment, applications may access data stored on disks drives via a set of operating system services including a file system. A file system includes a set of files on a disk and the program tools for maintaining the set of files. File systems that control the physical representation of objects, such directories and files, are known as physical file systems (PFSs).

Also included in a general purpose computer system environment is a kernel that performs basic functions, such as allocating hardware. The kernel is the central part in most computer operating systems and manages the system's resources and the communication between hardware and software components. As a basic component of an operating system, a kernel provides abstraction layers for hardware that allow hardware and software to communicate.

A logical file system (LFS) is the level of the file system at which users can request file operations using a system call. The LFS provides the kernel with a consistent view of what may be multiple physical file systems and multiple file system implementations.

A consistent view of file system implementation is made possible by a virtual file system (VFS). This virtual file system is an abstraction of a physical file system implementation. It provides a consistent interface to multiple file systems, both local and remote. The interface allows the LFS code in the kernel to operate without regard to the type of file system being accessed.

Each time a file is opened or made accessible, the file system creates a data structure, known as a "vnode", which is chained to the VFS. A vnode is an abstract representation of an active file and provides a generic way to operate on the real file it represents, regardless of the file system it resides on.

In a distributed computing environment, a number of computing systems can be interconnected by way of a communication network and can share files by way of a distributed file system. An example of a distributed computing system is a server-client system in which one or more remote client devices are serviced by one or more server devices. The server devices control access by the client devices to disks containing file system data.

A file exporter running on the server provides data to remote clients (which are connected to it). Access for locally exported file system data may be referred to as local access, while access for remotely exported file system data may be referred to as remote access. When a file server obtains data to fulfill a remote client's request for data, a cache manager process in the kernel of the file server caches a copy of the data. As long as the data does not change, the locally cached copy remains available to the remote client. A new copy is retrieved only when another process changes the data.

In contrast to remote clients, which are external to but connected to the distributed file system, there are also applications which are part the distributed file system. Data requests by applications are handled differently from requests from remote clients.

To understand how data requests from applications are handled, consider a sysplex, which is a system of mainframes acting together as a distributed file system. In a traditional sysplex, an application request is received by the LFS, and the LFS forwards the request for a remotely owned exported file system to the PFS of the owning file server. In this type of system, a server-type file exporter supplies on the server a program "G" to control local access to its exported file systems. This program is used to synchronize file changes and is invoked by the LFS. The LFS does not distinguish between types of file systems, whether local, remote, or strictly logical. The "G" program is invoked by the LFS before and after every vnode operation, i.e., each time a file is opened or made accessible, and a vnode is created. The coordination of file changes before and after every vnode operation is performed by getting and revoking tokens using the G program. The file exporter on each file server distributes tokens to allow access to data from the file server on behalf of remote clients or to allow access to PFS data by the LFS. The file exporter uses tokens to manage access to data and metadata. The tokens guarantee that remote clients and applications accessing the same data as the remote clients are provided with the most recent version of the data and that multiple clients are not accessing the same data in a conflicting manner.

As for remote clients, when a remote client wishes to access or change a file or directory that is managed by the file exporter, it first requests the appropriate tokens for the data from the file exporter. The file exporter's response to the client's request depends on the data the client wants to manipulate, the operation the client wants to perform on the data, and whether any other clients currently have tokens for the data.

If neither the LFS nor other clients have tokens for the data, the file exporter can issue the remote client the appropriate tokens. If outstanding tokens for the data exist, the file exporter can grant the request (if no conflicts arise between the request and the outstanding tokens), revoke the existing tokens to grant the request, or consider the request pending until it can grant it. In some cases, the file exporter simply refuses to grant the request. If the file exporter gives the client the necessary tokens, the client in turn can access the data from the file exporter in the fashion requested.

In a traditional sysplex, a file server only exports the file systems owned by the sysplex it is running on, i.e., the file system to which it has direct access to. In this type of system, a set of, e.g., z/OS systems communicate and cooperate with each other, through certain multisystem hardware and software components, to process user workloads. When the G program gets invoked on the local system, it communicates with the file server to coordinate the access by the LFS and remote clients.

When the PFS runs as sysplex-aware, i.e., the PFS allows a file system to be locally accessed on all members in a sysplex, this model breaks down because the LFS does not forward the file access requests for remotely owned file systems to the file server that owns the export for the file system, i.e., the file server that has direct access to the file system and is responsible for coordinating access to the file system. Therefore, the G program is not invoked, and the file exporter has no way to know when data changes or when to flush/update a cache. Instead, the PFS handles the request, whether local or remote, and performs its own caching. Because access to a remotely owned file system is not effectively coordinated, the file exporter's cached data may be inaccurate.

There is thus a need to improve the existing distributed file system access model to provide a file exporter with the ability to export a locally owned file system and a remotely owned file system and still maintain cache consistency.

SUMMARY

According to an exemplary embodiment, a method, computer program product, and system are provided for coordinating access to locally and remotely exported file systems. In response to an application request for file system access, a program is invoked to determine whether the request relates to a locally exported file system or a remotely exported file system. If the request relates to a locally exported file system, a local access routine is invoked to obtain access permissions to the locally exported file system. If the request relates to a remotely exported file system, a remote access routine is invoked to communicate with a local access routine in a file server responsible for coordinating access to the remotely exported file to obtain access permissions to the remotely exported file system.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains exemplary embodiments of the invention, together with advantages and features, by way of example with reference to the drawings.

DETAILED DESCRIPTION

According to an exemplary embodiment, a file exporter server is provided with the ability to export a sysplex-aware PFS regardless of ownership and still coordinate the local access from any sysplex member. This is achieved, according to one embodiment, by providing a program module with an additional routine for a LFS to invoke for remotely owned file systems.

According to one embodiment, each sysplex member is provided with two routines for program module "G", referred to herein as "G1" and "G2". The module containing the two routines may be provided upon registration. The G1 routine may be similar to the "G" program described above, invoked by the LFS for accessing a locally exported file system. The G2 routine may be a new routine contained in the "G" module that gets loaded on all members of the sysplex and that gets invoked by the LFS before and after every vnode operation on a sysplex member, if that sysplex member does not own the exported file system, i.e., if that sysplex member does not have the file system exported. The G2 routine can communicate with the G1 routine in the file server that owns the exported file system (i.e., has the file system exported), to coordinate the access across the sysplex. This allows a single file exporter to export all sysplex-aware file systems.

Figure 1A:
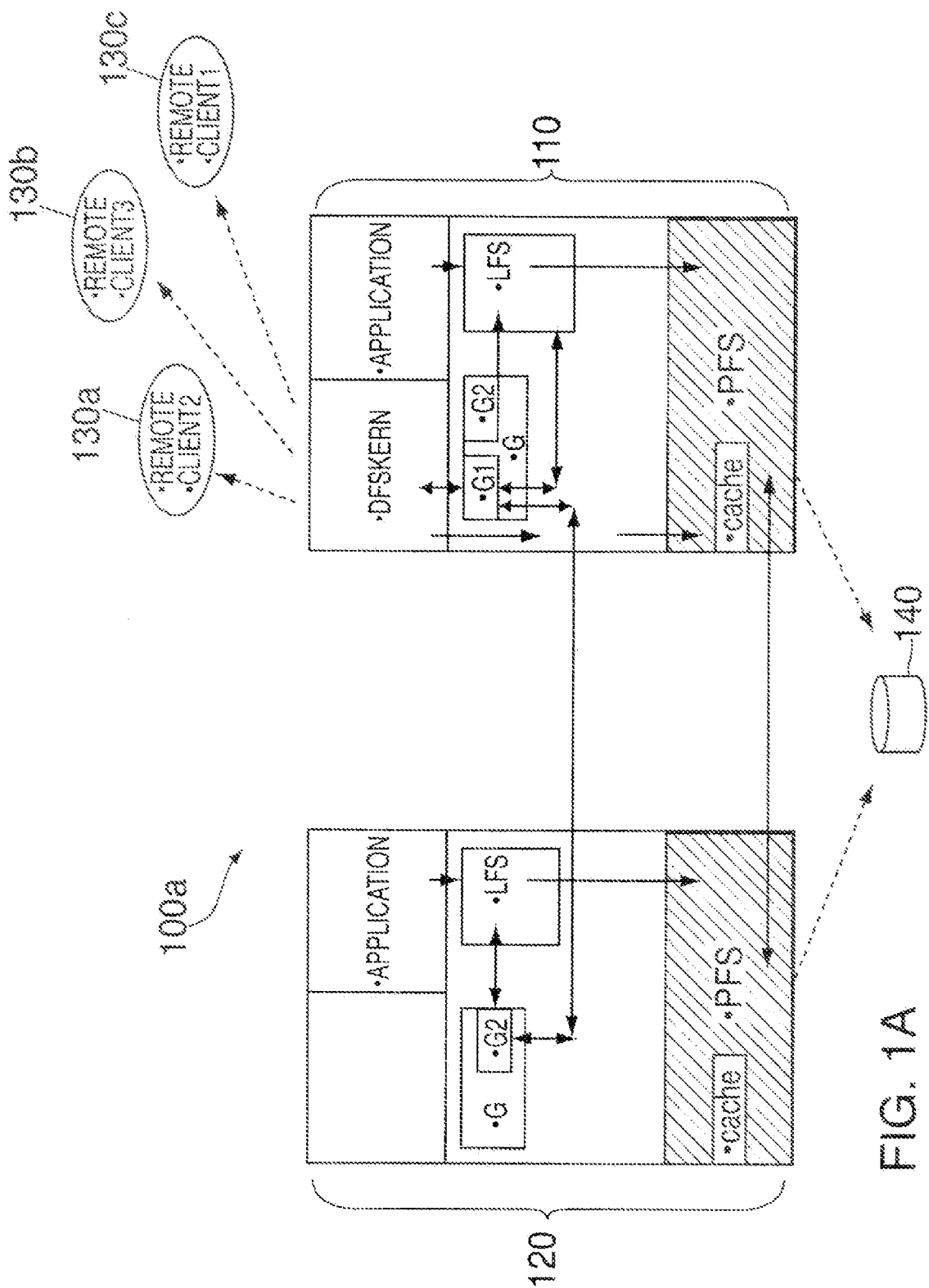
FIGS. 1A and 1B illustrate systems for coordinating access for locally and remotely exported file systems according to an exemplary embodiment.
Figure 1B:
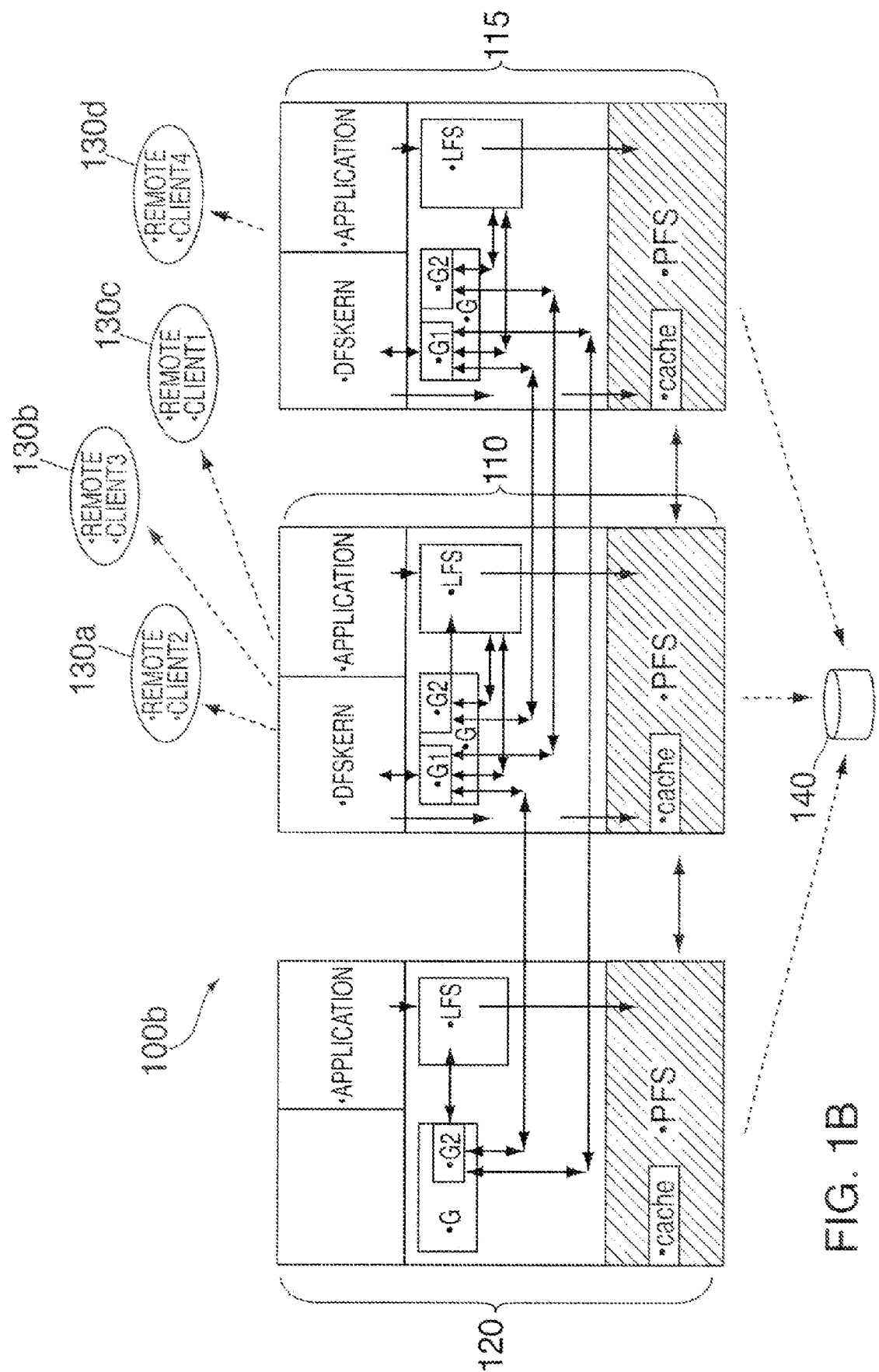

This may be understood with reference to FIGS. 1A and 1B which illustrate exemplary systems 100a and 100b, respectively, for coordinating access to locally and remotely exported file systems according to an exemplary embodiment.

Referring to FIG. 1A, the system 100a includes sysplex members 110 and 120. Each sysplex member may be implemented with, e.g., a z/OS system. Each sysplex member includes an LFS layer, a PFS layer, and one or more applications. In FIG. 1A, the PFS is represented at a logical level within the sysplex members 110 and 120 and at a physical level by the database 140.

According to an exemplary embodiment, a file server, such as a Distributed File Service Server Message Block (SMB server), may be running on a sysplex member, as shown with reference to sysplex member 110. The SMB server includes a kernel (labeled as DFSKERN to represent a distributed file system kernel). In the sysplex member 120, a SMB server is not running. The system shown in FIG. 1B is similar to that shown in FIG. 1A except that it includes an additional sysplex member 115 with a SMB server running. Although only two sysplex members are shown in FIG. 1A and three sysplex members are shown in FIG. 1B for simplicity of illustration, it should be appreciated that any number of sysplex members may be included.

As indicated by the arrows between the PFS's in both FIGS. 1A and 1B, the PFS's are "sysplex aware", meaning that they communicate with each other to obtain data for the LFS's. In this type of system, an LFS asks the local PFS for data, and the PFS obtains the data from its cache, if the data is there. Otherwise, the data is obtained from the disk.

In both systems 100a and 100b, each sysplex member is also provided with a module G containing two access routines, G1 and G2. This module containing the two routines may be loaded, for example, upon registration of the file server. As an alternative, the routines G1 and G2 may be loaded as separate modules.

According to an exemplary embodiment, the G module may be invoked by the LFS to coordinate getting and removing of tokens for accessing a locally exported file system using the G1 routine, while the G2 routine provides the mechanism to obtain access to a remotely exported file system. Each G module keeps track of all exports in the sysplex and which system owns the export. The file exporter can be updated to allow exporting of remotely owned file systems. The existing LFS code which invokes the G module for the G1 routine can be updated to use the G2 routine when a request is received for a remotely owned file system. The existing LFS sysplex communication can be used for the G2 routine in one sysplex member to communicate with the G1 routine in another sysplex member having a file server running to obtain access permissions to a remotely exported file system. According to an exemplary embodiment, the G1 routine and the G2 routine can communicate via a Cross System Coupling Facility (XCF). Pre/post operation enable the LFS to acquire appropriate permissions for file system access. The pre operation requests permission for access, and the post operation releases the access, i.e., lets the appropriate G program's routines known that the LFS is no longer accessing the file system.

In a sysplex member in which a file server is not running, such as the sysplex member 120, the G program including both routines G1 and G2 may be loaded, but the only routine that is used is the G2 routine. This is because there cannot be locally exported filed systems on the sysplex member 120, since the SMB server needs to be running to locally export. In the sysplex member 120, an application request may be issued to request access to any file system exported by any file server in the sysplex. In this scenario, the LFS in the sysplex member 120 invokes the G program, and the G2 routine sends a token request to the owner of the export, whether it is the sysplex member 110 or the sysplex member 115. The SMB server owning the export can then coordinate access for that file system and thus keep a cache for satisfying remote client requests.

In system 110a, the sysplex member 110 may be connected to remote clients 130a, 130b, and 130c, and in system 100b, the sysplex member 115 may be connected to remote client 130d. The remote clients may be connected via, e.g., TCPIP connections. While only four remote clients are shown for simplicity of illustration, it should be appreciated that any number of remote clients may be connected to the sysplex members 110 and 115. The sysplex members 110 and 115 may supply the remote clients with access to data stored and cached in their respective PFS's. There may also be applications accessing the file systems in the sysplex members 110 and 115. These applications may be included within the sysplex members 110 and 115 or may be in other sysplex members, such as sysplex member 120.

If an application requests to access a file system, the LFS in the sysplex member containing that application will invoke the G program. A determination is made whether the request is for a locally exported file system or a remotely exported file system. If the request is for a file system that is exported locally, the G1 routine will communicate with the DFSKERN in that sysplex member to generate tokens, revoke tokens or deny tokens, as appropriate. The G1 routine in the file server owning the file system knows if there has been access to the file system and knows if there is a conflicting request. If there is a conflicting request, the G1 routine can revoke the existing token and issue a new one to allow access, refuse to provide a token, or hold the request pending. Once the token is obtained, the LFS retrieves the data from the PFS on the local system and returns it to the requesting application. As long as the LFS holds the token, the SMB server will known not to use the cached data to satisfy a remote client's request for the same file.

If the request from an application is for a remotely exported file system, the G2 routine is invoked to forward the request for access to the G1 routine in the sysplex member owning the remotely exported file system. According to an exemplary embodiment, the G2 routine may be invoked in each sysplex member before and after every vnode operation on the sysplex members not owning the export to keep any cached data up to date. When the G1 routine in the sysplex member owning the remotely exported file system receives the request for access, it communicates with the DFSKERN in the sysplex member owning the remotely exported file system, generates tokens as appropriate, and returns the generated tokens to the G2 routine of the requesting sysplex member to allow data within the PFS to be retrieved and returned to the requesting application via the Cross System Coupling Facility (XCF). The token is held by the LFS of the sysplex member owning the remotely exported filed system, and as long as the LFS holds the token, the SMB server in that sysplex member will know not to use the cached data to satisfy a remote client's request for the same file.

Figure 2:
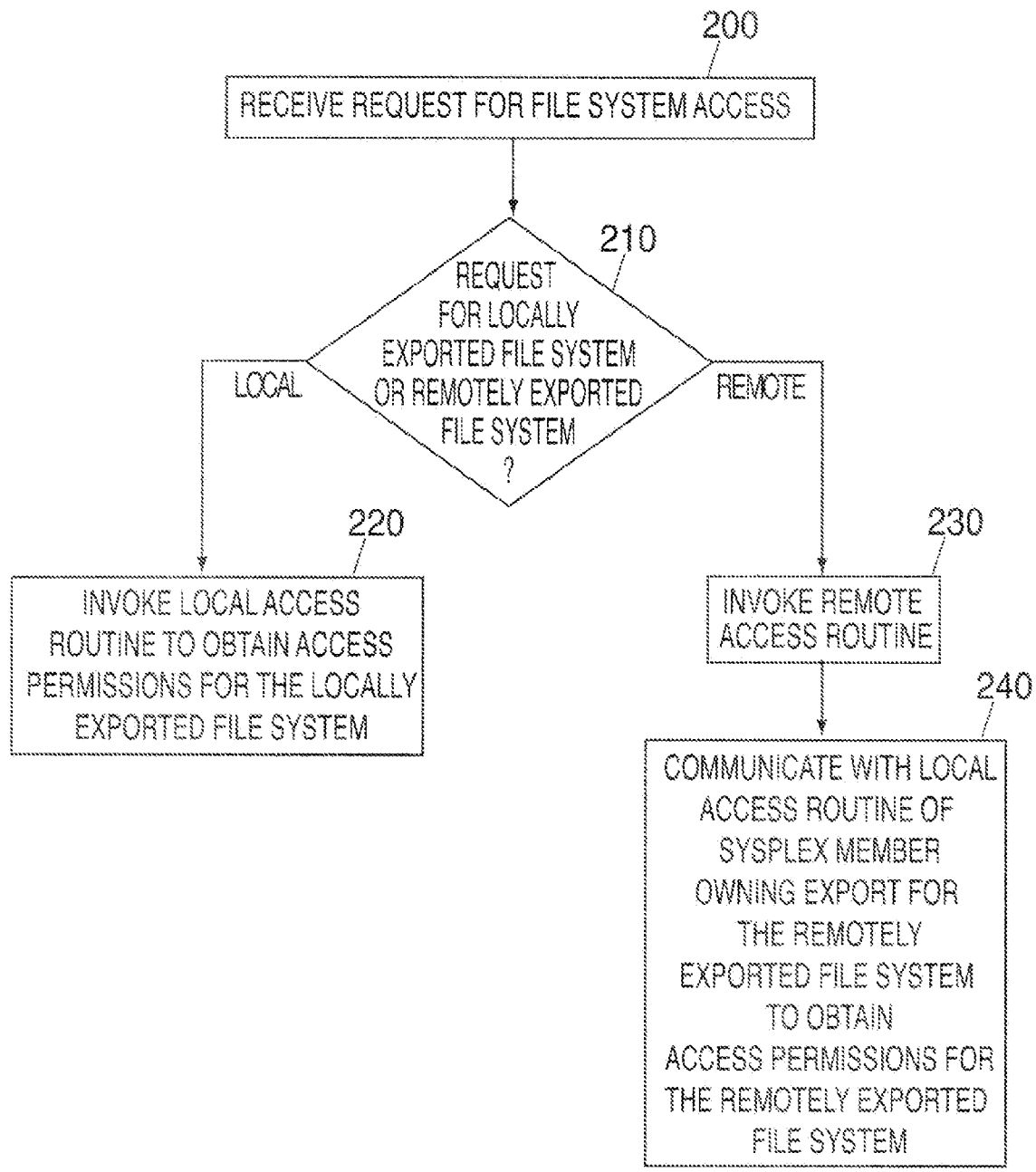
FIG. 2 illustrates a method for coordinating access for locally and remotely exported file systems according to an exemplary embodiment.

FIG. 2 illustrates a method for coordinating access to locally and remotely owned file systems. At step 200, a request for file system access is received. According to an exemplary embodiment, the request is received at a G program in a member of a multi-node sysplex. At step 210, a determination is made by the G program whether the request is for a locally exported file system or if the request is for a remotely exported file system. The request may be generated by an application or received from a remote client. A remote client can only access locally exported file systems, while the application can access either locally or remotely exported file systems. If, at step 210, it is determined that the request is for a locally exported file system, a local access routine (G1) is invoked to obtain access permissions to the locally exported file system data at step 220. If, at step 210, it is determined that the request is for the remotely exported file system, a remote access routine (G2) is invoked at step 230. At step 240, the remote access routine communicates with a local access routine (G1) in the file server owning the export, i.e., the file server responsible for coordinating access to the remotely exported file system, to obtain access to the remotely exported file system.

As described above, embodiments can be embodied in the form of computer-implemented processes and apparatuses for practicing those processes. In exemplary embodiments, the invention is embodied in computer program code executed by one or more network elements. Embodiments include computer program code containing instructions embodied intangible media, such as floppy diskettes, CD-ROMs, hard drives, or any other computer-readable storage medium, wherein, when the computer program code is loaded into and executed by a computer, the computer becomes an apparatus for practicing the invention. Embodiments include computer program code, for example, stored in a storage medium, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method for coordinating access to locally and remotely exported file systems facilitated by a system including a plurality of computers acting together as a distributed file system, the distributed file system comprising a plurality of separate file systems each distributed to a different computer of the plurality of computers, and each computer of the plurality of computers including a local access routine and a remote access routine configured to promote access to both a local portion of the distributed file system and remote portions of the distributed file system, comprising:

in response to a request for file system access at a first computer of the plurality of computers, determining whether the request relates to a locally exported file system local to the first computer or a remotely exported file system local to a second computer;

if the request is requesting the locally exported file system, invoking the local access routine at the first computer to obtain local access permissions to the locally exported file system, and permitting a computer issuing the request access to the locally exported file system, wherein the local access routine provides tokens to allow access permissions to the locally exported file system based on existing requests requesting access to the locally exported file system by revoking tokens of the existing requests; or if the request is requesting the remotely exported file system, invoking the remote access routine to obtain remote access permissions to the remotely exported file system, the remote access routine requesting the remote access permissions from a local access routine existing on the second computer, and permitting the computer issuing the request access to the remotely exported file system.

2. The method of claim 1, wherein the remote access routine communicates with a local access routine in a file server responsible for coordinating access to the remotely exported file system to obtain access permissions to the remotely exported file system.

3. The method of claim 1, wherein the step of invoking the remote access routine is performed by an application to obtain access permissions to a remotely exported file system.

4. The method of claim 1, wherein the request for file system access is received at one of multiple file servers in a sysplex that includes a sysplex-aware physical file system.

5. The method of claim 1, further comprising caching data for a file system and updating the cached data when the file system changes.

6. The method of claim 1, wherein if there is a conflicting request requesting the locally exported file system, the local access routine revokes a token for the conflicting request and issues a token to allow access to the computer issuing the request, refuses to provide a token to the computer issuing the request, or holds the request pending.

7. The method of claim 2, wherein the local access routine of the file server owning the export for the remotely exported file system provides tokens to allow access permissions to the remotely exported file system.

8. A computer program product for coordinating access to locally and remotely exported file systems, comprising a computer usable medium having a computer readable program instructions that when executed on a computer, cause the computer to implement a process for coordinating access to locally and remotely exported file systems facilitated by a system including a plurality of computers acting together as a distributed file system, the distributed file system comprising a plurality of separate file systems each distributed to a different computer of the plurality of computers, and each computer of the plurality of computers including a local access routine and a remote access routine configured to promote access to both a local portion of the distributed file system and remote portions of the distributed file system, comprising:

in response to a request for file system access at a first computer of the plurality of computers, determining whether the request relates to a locally exported file system local to the first computer or a remotely exported file system local to a second computer;

if the request is requesting the locally exported file system, invoking the local access routine at the first computer to obtain local access permissions to the locally exported file system, and permitting a computer issuing the request access to the locally exported file system, wherein the local access routine provides tokens to allow access permissions to the locally exported file system based on existing requests requesting access to the locally exported file system by revoking tokens of the existing requests; or if the request is requesting the remotely exported file system, invoking the remote access routine to obtain remote access permissions to the remotely exported file system, the remote access routine requesting the remote access permissions from a local access routine existing on the second computer, and permitting the computer issuing the request access to the remotely exported file system.

9. The computer program product of claim 8, wherein the computer readable medium causes the remote access routine to communicate with a local access routine in a file server responsible for coordinating access to the remotely exported file system to obtain access permissions to the remotely exported file system.

10. The computer program product of claim 8, wherein the request for file system access is received at one of multiple file servers in a sysplex that includes a sysplex-aware physical file system.

11. The computer program product of claim 8, wherein the computer readable medium causes the computer to cache data obtained from a file system and update the cached data when data obtained from the file system changes.

12. The computer program product of claim 8, wherein if there is a conflicting request requesting the locally exported file system, the local access routine revokes a token for the conflicting request and issues a token to allow access to the computer issuing the request, refuses to provide a token to the computer issuing the request, or holds the request pending.

13. The computer program product of claim 9, wherein the local access routine of the file server owning the export for the remotely owned file system provides tokens to allow access permissions to the remotely exported file system.

14. A system for coordinating access to locally and remotely exported file systems facilitated by a plurality of computers within the system acting together as a distributed file system, the distributed file system comprising a plurality of separate file systems each distributed to a different computer of the plurality of computers, comprising:

a program on each computer of the plurality of computers for determining whether a received request for file system access relates to a locally exported file system or a remotely exported file system;

a local access routine on each computer of the plurality of computers for obtaining access to the locally exported file system, wherein the local access routine provides tokens to allow access permissions to the locally exported file system based on existing requests requesting access to the locally exported file system b revoking tokens of the existing requests; and a remote access routine on each computer of the plurality of computers for obtaining access permissions to the remotely exported file system, wherein if the pro gram of a first computer of the plurality of computers determines that a request for file system access is requesting the locally exported file system, the program invokes the local access routine of the first computer to obtain access permissions to the locally exported file system, and if the program determines that the request is requesting the remotely exported file system, the program invokes the remote access routine to obtain access permissions to the remotely exported file system.

15. The system of claim 14, wherein the remote access routine communicates with a local access routine of a file server responsible for coordinating access to the remotely exported file system to obtain access permissions to the remotely exported file system.

16. The system of claim 14, wherein an application invokes the remote access routine to obtain access permissions to the remotely exported file system.

17. The system of claim 14, wherein the request for file system access is received at one of multiple file servers in a sysplex that includes a sysplex-aware physical file system.

18. The system of claim 14, further comprising a cache for caching data obtained from a file system, wherein the cached data is updated when the file system changes.

19. The system of claim 14, wherein if there is a conflicting request requesting the locally exported file system, the local access routine revokes a token for the conflicting request and issues a token to allow access to the computer issuing the request, refuses to provide a token to the computer issuing the request, or holds the request pending.

20. The system of claim 15, wherein the local access routine of the file server owning the export for the remotely exported file system generates tokens to allow access permissions to the remotely exported file system.

\* \* \* \* \*